April 26, 1949.   R. C. GREGORIUS   2,468,439
AUTOMOBILE VENTILATING SHIELD
Filed Dec. 30, 1947
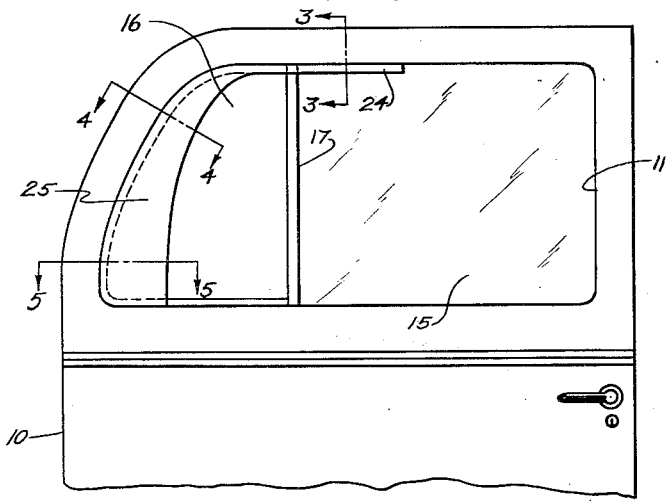
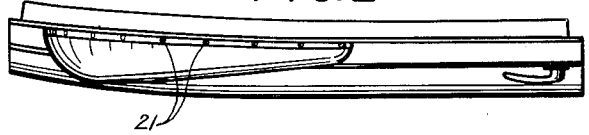
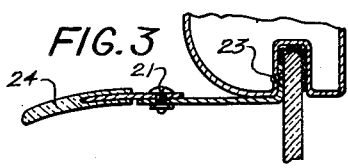
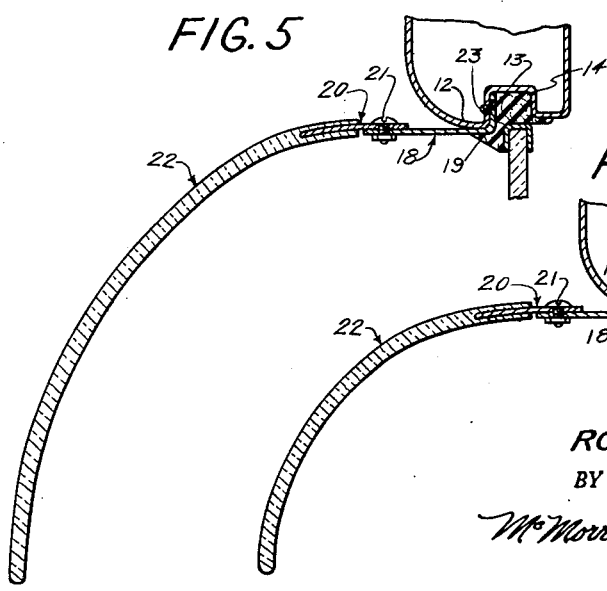
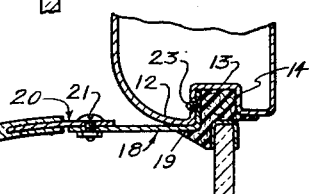
*INVENTOR.*
ROBERT C. GREGORIUS
BY
McMorrow, Berman & Davidson
*Attorneys*

Patented Apr. 26, 1949

2,468,439

UNITED STATES PATENT OFFICE 2,468,439

AUTOMOBILE VENTILATING SHIELD

Robert C. Gregorius, Norfolk, Va.

Application December 30, 1947, Serial No. 794,687

1 Claim. (Cl. 98—2)

This invention relates to improvements in automobile ventilating shields and more particularly to an improved shield for the window in a door inclosing the front or driver's compartment of a motor vehicle such as an automobile or truck.

The front doors of a four-door vehicle or both doors of a two-door vehicle are conventionally provided with window openings and vertically slidable panes which may be manually raised and lowered to open and close the portion of the window opening controlled thereby. Such doors may also be provided with swingable panes, the swingable pane for each door being disposed between the forward edge of the vertically-slidable pane and the front edge of the window opening.

It is frequently necessary, even in cold or rainy weather, to have one or both of the panes in the door nearest the driver open for the purpose of making hand-signals and for better observation of traffic conditions in heavy traffic. It is also necessary at times to have the window in one or in both of the front or driver compartment doors open for ventilation of the automobile body or truck cab.

Such opening of one or both of the windows mentioned causes drafts in the body or cab which are uncomfortably cold in cold weather and also permits rain and snow to blow into the body or cab.

It is among the objects of the invention to provide an improved shield structure for the window of the front or driver compartment door of an automobile or truck which shield will exclude drafts, rain and snow when the window is open, does not interfere with the operation of the window or the door, is easy to attach to the conventional door structure without requiring any material modification thereof, may be removed or replaced without requiring disassembly of any part of the door and window structure, is of smooth, rounded form and contained entirely within the boundary of the vehicle body contour so that it does not constitute a hazard which might cause personal injury or accidental damage to the shield, and which shield is transparent so as not to interfere with vision through the window, is of simple, durable and economical construction, neat and attractive in appearance, and of stream-lined shape to create a minimum disturbance of the air while deflecting the air-flow away from the window with which it is associated.

Other objects and advantages will become apparent from a consideration of the following description in conjunction with the accompanying drawing, wherein:

Figure 1 is an elevational view of the outer surface of the upper portion of a conventional automobile or truck door showing a window in the upper portion of the door and a window-shield illustrative of the invention attached to the door in operative association with the window.

Figure 2 is a top plan view of the door and shield illustrated in Figure 1.

Figure 3 is a transverse cross-section taken substantially in the plane of the section line 3—3 of Figure 1.

Figure 4 is a transverse cross-section taken substantially in the plane of the section line 4—4 of Figure 1.

Figure 5 is a transverse cross-section taken substantially in the plane of the section line 5—5 of Figure 1.

With continued reference to the drawing, a door, generally indicated at 10, is provided in its upper portion with a window-opening 11 of generally rectangular form but having a forwardly and downwardly inclined front edge joined by curved edge portions to the upper and lower edges. The door structure surrounding the window-opening includes a bezel 12 providing a window surrounding groove 13 of substantially-rectangular cross-sectional shape in which is mounted a sealing strip 14.

The window illustrated has a vertically-movable pane 15 and a swingable pane 16 between the forward edge of the vertically-slidable pane and the front edge of the window opening. A mullion 17 extends from the bottom to the top of the window opening at the forward edge of the vertically-movable pane 15 providing a guideway for the forward edge of this pane and a closing abutment for the rearward edge of the swingable pane 16.

It is to be understood however, that the invention is in no way limited to any particular form of window and the improved shield is especially adapted for use with a window having a single vertically-slidable pane.

The improved window shield assembly comprises an elongated strip of thin sheet material, such as sheet-metal, generally indicated at 18, having an apertured up-set flange 19 along one edge thereof, a second strip of thin sheet material, generally indicated at 20, detachably connected along one edge to the strip 18 by suitable means, such as the screws 21, and a body of transparent sheet material, generally indicated at 22, permanently secured along its outer edge to the edge of the strip 20 opposite that attached to the strip 18.

The sheet-metal strip 18 has a longitudinal shape conforming to the shape of the front portion of the window opening 11 and extends along the upper edge of the window opening from substantially the mid-length location of this upper edge forwardly and down the front edge of the window opening to the lower edge thereof and rearwardly of the lower edge a distance somewhat less than one-half the distance from the bottom end of the mullion 17 to the junction of the front and bottom edges of the window opening. The up-set apertured flange 19 of this strip fits into the groove 13 and is disposed between the sealing strip 14 and the outer wall of the groove, as clearly illustrated in Figures 3, 4 and 5, fastening elements, such as small screws 23, being inserted through the flange and the outer wall of the groove to secure the strip 18 firmly to the door structure around the window opening.

The second strip 20 of sheet material is substantially straight transversely, and is longitudinally curved to conform to the longitudinal shape of the strip 18. This strip 20 is provided near one edge with spaced apertures which register with corresponding apertures provided in strip 18 adjacent the edge thereof opposite flange 19 and the screws 21 extending through the registering apertures in the two strips 18 and 20 detachably secure these two strips together so that the transparent body 22 may be removed or replaced without the necessity of removing the strip 18 from the door structure thus avoiding the necessity of removing the window panes and sealing strips from the door in order to remove or replace the shield.

The body 22 of transparent sheet material is transversely curved, as is clearly illustrated in Figures 3, 4 and 5 and is permanently secured along its forward edge to the corresponding edge of strip 20 preferably by having the outer edge portion of the body 22 slotted and the edge portion of strip 20 secured in the slot. The outer edge of body 22 has a longitudinal shape which conforms to the longitudinal shape of the two strips 18 and 20 which in turn conform to the shape of the front portion of the window opening 11. The rearward or inner edge of the body 22 is laterally off-set from the front or outer edge thereof and conforms generally to the shape of the outer edge of the body but diverges therefrom in a manner to provide at the top of the shield a narrow, elongated top portion 24 which extends outwardly at the top of the window opening to provide a drip-shield, as particularly illustrated in Figure 3, and a forward portion 25 wider than the top portion 24 and tapering in width from the bottom toward the top thereof.

The portion of the inner edge bounding the wider shield portion 25 is preferably concavely curved, as shown in Figure 1, to enhance the appearance of the shield and provide a smooth junction with the substantially straight portion of the inner edge lying along the narrow top portion 24. The inner edge also diverges gradually from the outer edge in a lateral direction from the upper or rearward ends of the two edges to the lower or forward ends as illustrated in Figures 1 and 2. The difference in the transverse or cross-sectional extent of the transparent body at the three stations indicated by the section lines 3—3, 4—4 and 5—5 being clearly illustrated in Figures 3, 4, and 5.

The two strips 18 and 20 are preferably formed of a thin, somewhat resilient, non-corrosive sheet material such as stainless steel, copper or aluminum and the transparent body 22 may be conviently formed of a thermo-plastic or thermo-setting transparent material several forms of which are presently known to the art. The transparent body 22 may be shaped by the application of heat and pressure in any convenient manner to provide the concavo-convex form of this member as illustrated.

There is thus provided a convenient and attractive, stream-lined window shield which will effectively deflect the air flow away from the window when the window is open to prevent drafts and prevent rain and snow from being driven in through the open window, which shield may be easily attached to an existing automobile or easily applied as standard equipment on new automobiles and may be replaced or removed without the necessity of disassembling any part of the automobile structure surrounding the associated window.

The invention may be embodied in other specific forms without departing from the spirit or essential characteristic thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

A window shield for attachment to an automobile door adjacent a window therein comprising a first strip of thin sheet material having a right angular outwardly extending flange along one edge thereof, a second strip of sheet material detachably secured to said first strip, and a concavo-convex body of transparent sheet material permanently secured along one edge to an edge of said second strip of sheet material, said first strip of sheet material extending across the forward portion of the top edge of a window opening, along the front edge, and along a small forward portion of the bottom edge of the window opening with its up-set flange receivable in a sealing strip groove adjacent the window opening, said second strip having a longitudinal shape conforming to that of said first strip, and said body of transparent sheet material having a curved cross-sectional shape, an outer edge shape conforming to the longitudinal shape of said strips of sheet material, and an inner edge laterally off-set from said outer edge and having a longitudinal shape conforming generally to the longitudinal shape of said outer edge but providing a narrow upper portion and a tapered forward portion wider than said upper portion between said inner and outer edges, said outer and inner edges diverging from the upper rearward to the lower forward ends thereof.

ROBERT C. GREGORIUS.

REFERENCES CITED

The following references are of record in the file of this patent:

UNITED STATES PATENTS

| Number | Name | Date |
|---|---|---|
| 1,680,966 | Winans | Aug. 14, 1928 |
| 1,891,390 | Liebig | Dec. 20, 1932 |
| 2,084,613 | Foley | June 22, 1937 |
| 2,100,829 | Young | Nov. 30, 1937 |
| 2,281,840 | Hamilton | May 5, 1942 |